United States Patent [19]

Tsuru

[11] Patent Number: 4,771,679
[45] Date of Patent: Sep. 20, 1988

[54] AIR BOX CONSTRUCTION FOR AUTOMOTIVE VEHICLES

[75] Inventor: Noritaka Tsuru, Fujisawa, Japan
[73] Assignee: Nissan Motor Co., Ltd., Japan
[21] Appl. No.: 139,085
[22] Filed: Dec. 23, 1987

Related U.S. Application Data

[63] Continuation of Ser. No. 878,707, Jun. 26, 1986, abandoned.

[30] Foreign Application Priority Data

Jun. 27, 1985 [JP] Japan .............. 60-96577[U]

[51] Int. Cl.[4] .............................................. B60H 1/23
[52] U.S. Cl. ...................................... 98/2.16; 98/2.07
[58] Field of Search ............ 98/2, 2.16, 2.17, 2.07; 296/84 R, 84 A, 84 D, 90

[56] References Cited

U.S. PATENT DOCUMENTS

| 2,800,067 | 7/1957 | Belfry | 98/2.16 |
| 3,301,161 | 1/1967 | Attwood et al. | 98/2.07 |
| 3,327,603 | 6/1967 | de Castelet | 98/2.07 |
| 3,845,983 | 11/1974 | Heintz | 296/84 |

FOREIGN PATENT DOCUMENTS

| 34516 | 4/1981 | Japan | 296/84 D |
| 136511 | 8/1983 | Japan | 296/84 R |
| 29509 | 2/1984 | Japan | 296/84 A |
| 29510 | 2/1984 | Japan | 296/84 A |
| 122272 | 8/1984 | Japan . | |
| 59-122972 | 8/1984 | Japan . | |

*Primary Examiner*—Steven E. Warner
*Attorney, Agent, or Firm*—Leydig, Voit & Mayer

[57] ABSTRACT

An air box has at a forward side thereof an air inlet or inlets. A pouch-shaped air intake is attached to the forward side of the air intake for drawing air to the air inlet or inlets. A wiper unit is installed on the air box in such a manner as to partly project into the inside of the air intake. A wiper pivot is installed on the forward side of the air box in such a manner as to have an upper portion projecting into the inside of the air intake.

5 Claims, 3 Drawing Sheets

AIR BOX CONSTRUCTION FOR AUTOMOTIVE VEHICLES

This application is a continuation of application Ser. No. 878,707 filed June 26, 1986 now abandoned.

BACKGROUND OF THE INVENTION

1. Field of the Invention

The present invention relates in general to automotive vehicles and more particularly to an air box construction for an automotive vehicle of the kind adapted to be installed at the lower end of a windshield at a place more forward than in previous practice to increase the inclination of the windshield glass relative to the vertical.

2. Description of the Prior Art

In order to attain a low-drag body, windshield glass has been installed more forward than before so that the inclination of the windshield glass relative to the vertical is increased. An example of such a vehicle body design is disclosed in the Japanese Provisional Utility Model Publication No. 59-122972 and also shown in FIG. 5. Referring to the FIG. 5, a upper dashboard 1 is joined with a cowl top 2 to define an air box 3. A windshield glass 4 is installed on the upper forward end of the air box 3 to have a lower end projecting forward. The air box 3 has, under the windshield glass mounting portion, an air inlet 6 in which a cowl top grille 5 is fitted. A support panel 8 projects from the air box 3 at a place adjacent to the lower end of the cowl top grille 5 toward an engine hood 7 and has installed thereon a wiper pivot 9. A wiper arm 10 is driven, by a wiper link 11. The air box is supported by a lower dash 12. With the above arrangement, air is drawn through the space between the engine hood 7 and the windshield glass 4 and through the cowl top grille 5 into the air box 3 from which it is drawn into a passenger compartment.

A disadvantage of the above described air box construction is that the wiper pivot is not directly installed on the rigid air box but on the support panel, resulting in a likelihood of undesirable vibration of the wiper arm, called wiper shudder.

Another disadvantage is that it is not easy to install the wiper pivot accurately since the wiper pivot is not installed on the air box on which the windshield glass is installed.

A further disadvantage is that the wiper link is exposed to viewers when the engine hood is in an open position.

A still further disadvantage is that the lower end of the windshield glass is not supported but projects forwardly from the air box, resulting in a lack of support of the lower end of the windshield glass.

SUMMARY OF THE INVENTION

In accordance with the present invention, there is provided a novel and improved arrangement of an air box in a vehicle. The arrangement comprises an air box of a box-like cross section including an upper side and a lower side, a windshield glass installed on the upper side of the air box, a front side of the air box formed with an air inlet, an air intake attached to the front side of the air box for directing air to the air intake, and a wiper unit installed on the air box in such a manner as to partly project into the inside of the air intake.

The above structure is quite effective for overcoming the above noted disadvantages and shortcomings inherent in the prior art arrangement.

It is accordingly an object of the present invention to provide a novel and improved arrangement in an automotive vehicle which makes it possible to install the lower end of a windshield glass at a place more forward than previously without causing any disadvantages and shortcomings.

It is another object of the present invention to provide a novel and improved arrangement of the above described character which can prevent undesirable vibration of a wiper arm such as wiper shudder.

It is a further object of the present invention to provide a novel and improved arrangement of the above described character which makes it easy to install a wiper pivot accurately.

It is a further object of the present invention to provide a novel and improved arrangement of the above described character which can prevent a wiper link of a wiper unit from being exposed to viewers when an engine hood is in an open position.

It is a further object of the present invention to provide a novel and improved arrangement of the above described character which can better support of the lower end of the windshield glass.

DETAILED DESCRIPTION OF THE PREFERRED EMBODIMENTS

Figure 1:
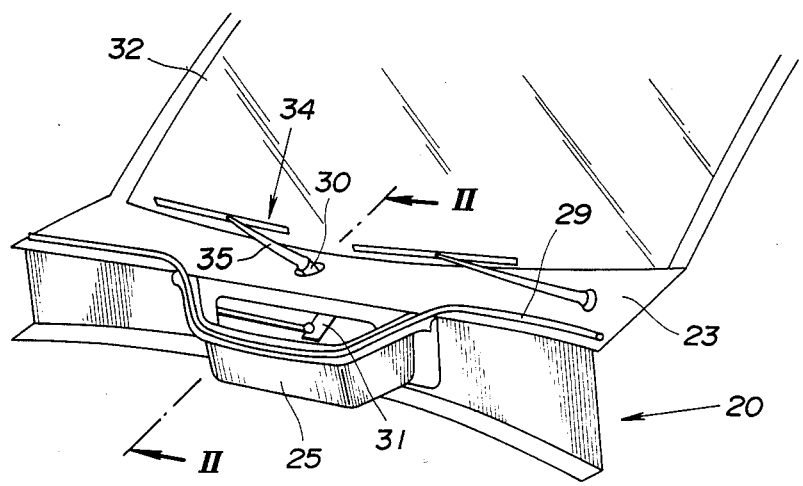
FIG. 1 is a perspective view of an air box construction for an automotive vehicle according to an embodiment of the present invention.
Figure 2:
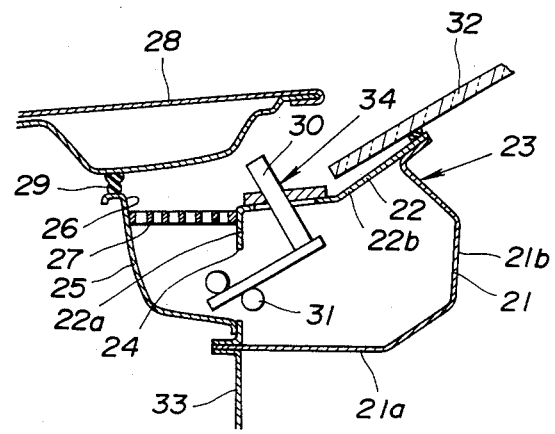
FIG. 2 is a sectional view taken along the line II—II in FIG. 1.

Referring to FIGS. 1 and 2, an air box construction for an automotive vehicle of the present invention is generally indicated by the reference numeral 20 and shown as including an upper dash 21 and a cowl top 22 which are joined together to constitute an air box 23 which transverses the vehicle body and has a box-like cross section. More specifically, the upper dash 21 is attached at an end thereof to the upper end of a lower dash 33 and has an L-like cross section including a first side 21a extending rearwardly from the upper end of the lower dash 33 and a second side 21b extending upwardly from the rearward end of the first side 21a. The cowl top 22 is attached at an end thereof to the upper end of the lower dash 33 together with the corresponding end of the upper dash 21 and has an L-like cross section including a first side 22a extending upwardly from the upper end of the lower dash 33 and a second side 22b extending rearwardly from the upper end of the first side 22a to terminate in an end joined with the corresponding end of the upper dash 21. The air box 23 is thus provided with a pair of forward and rearward sides 22a, 21b and a pair of upper and lower sides 22b, 21a.

The air box 23 has at the forward side 22a thereof an air inlet 24. A pouch-shaped air intake 25 or an air intake 25 formed from a pouch-shaped panel is attached to the forward side 22a of the air box 23 to define an opening 26 in communication with air inlet 24. A wiper unit 34 is shown as including a wiper pivot 30, a wiper link 31 interconnecting a power source (not shown) and the wiper pivot 30 to drive the wiper pivot 30 and a wiper arm 35 installed on the upper end of the wiper pivot 30 to rotate therewith. The wiper pivot 30 is installed on the upper side 22b of the air box 23 at a place adjacent the forward end thereof and in such a manner that the upper portion of the wiper pivot 30 projects forwardly and outwardly of the air box 23 while the lower portion projects rearwardly and inwardly of the air box 23 and that the wiper link 31, which is disposed in the air box 23 and connected to the lower end of the wiper pivot 30, partly projects through the air inlet 24 into the inside of the air intake 25, i.e., the wiper link 31 is partly disposed in the inside of the air intake 25. The lower end of a windshield glass 32 is installed on the upper side of the air box 23 at a place closely rearward of the place at which the wiper pivot 30 is installed. An engine hood 28 is pivotally installed and has a movable rear end portion. A sealing member 29 is attached to the upper end of the air intake 25 and the upper side 22b of the air box 23 to provide a seal between the rear end portion of the engine hood 28 and both of the air intake 25 and the air box 23 when the engine hood 28 is in a closed position.

The above structure enables the wiper link 31 to partly project into the inside of the air intake 25, whereby to make it possible to install the wiper pivot 30 on the upper side of the air box 23 at a place closely adjacent to the forward end thereof. By this, it becomes possible to displace the lower end of the windhsield glass 32 forward by an amount corresponding to the amount by which the wiper link 31 projects into the inside of the air intake 25. Further, since the lower end of the windshield glass 32 is installed on the upper side of the air box 23, it is well supported. Still further, since the wiper pivot 30 is directly installed on the air box 23, it can be installed accurately and rigidly. Also, though the wiper link 31 projects outward from the air inlet 24, it is not exposed to viewers since the air inlet 24 is concealed by the air intake 25 provided with the grille 27.

Figure 3:
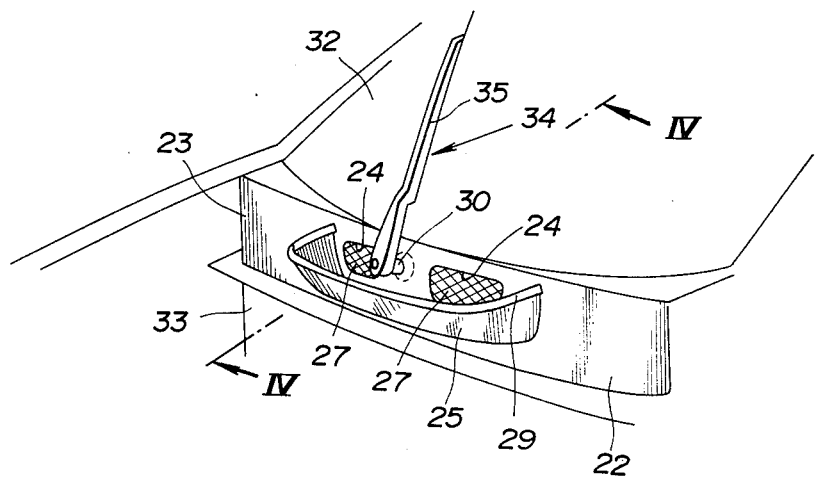
FIG. 3 is a view similar to FIG. 1 but showing a modification of the present invention.
Figure 4:
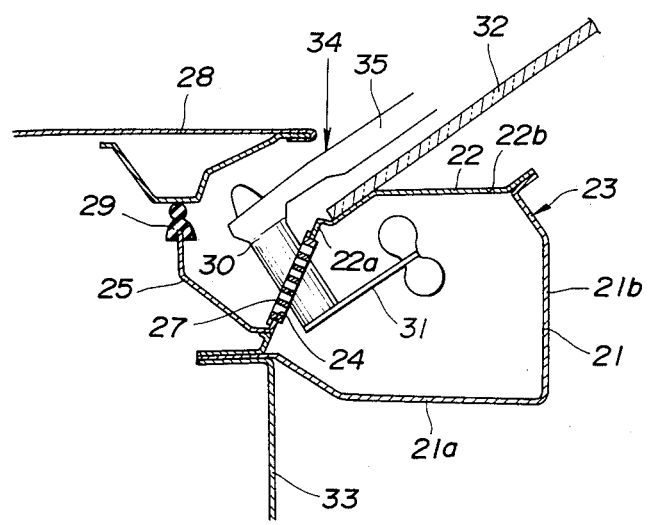
FIG. 4 is a sectional view taken along the line IV—IV in FIG. 3.
Figure 5:
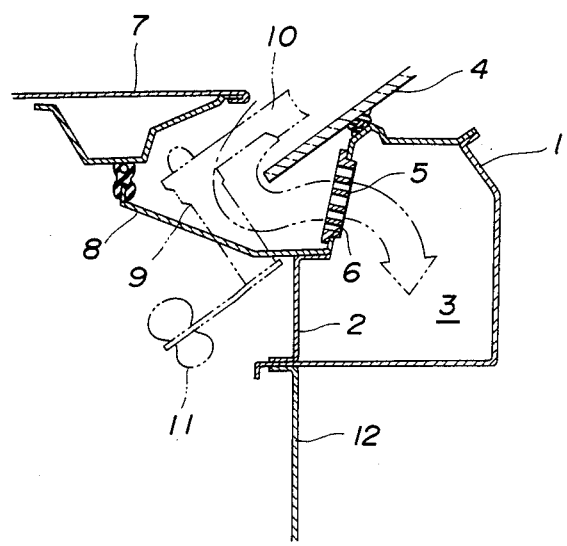
FIG. 5 is a sectional view of a prior art air box construction for an automotive vehicle.

A modification of the present invention is shown in FIGS. 3 and 4 in which parts and portions like or corresponding to those of the previous embodiment are designated by like reference numerals. In this modified embodiment, the wiper pivot 30 is installed on the forward side 22a of the air box 23 in such a manner that the upper portion of the wiper pivot 31 projects into the air intake 25 while the lower portion of the wiper pivot 30 projects into the air box 23 to be received therein together with the wiper link 31. The forward side 22a of the air box 23 has two air inlets 24 on the opposite sides of the portion on which the wiper pivot 30 is installed. The air inlet 24 are respectively fitted with louvers or grilles 27. The forward side 22a of the air box 23 has an upper end portion slanting rearwardly, on which upper end portion the lower end of the windshield glass 32 is installed. In other words, the windshield glass 32 has a lower end installed on the upper side 22a of the air box 23 at a place just above of the place at which the wiper pivot 30 is installed. The sealing member 29 is installed on the upper end of the air intake 25 only to provide a seal between the air intake 25 and the engine hood 28.

With the above structure, the lower end of the windshield glass 32 can be displaced to the forward side 22a of the air box 23, whereby to make it possible to install the lower end of the windshield glass 32 at a place more forward than on the previous embodiment.

I claim:

1. In a vehicle, the combination of an air box of box-like cross section including an upper side and a forward side, a windshield glass installed on said upper side of said air box, said front side of said air box being formed with an air inlet, an air intake having a pouch-like shape and attached to said front side of said air box for directing air to said air inlet, a wiper unit installed on said air box in such a manner as to partly project into the inside of said air intake, and a lower dash having an upper end, said air box consisting of an upper dash and a cowl top, said upper dash being attached at an end thereof to said upper end of said lower dash and having an L-like cross section including a first side extending rearwardly from said upper end of said lower dash and a second side extending upwardly from a rear end of said first side, said cowl top being attached at an end thereof to said upper end of said lower dash and having an L-like cross section including a first side extending upwardly from said upper end of said lower dash and a second side extending rearwardly from an upper end of said second mentioned first side to terminate at an end joined with a corresponding end of said upper dash, said upper and forward sides of said air box being respectively constituted by said second and first side of said cowl top, said wiper unit including a wiper pivot installed on said forward side of said air box and having an upper portion projecting forwardly and outwardly of said air box into the inside of said air intake and a lower portion projecting rearwardly and inwardly of said air box, and a wiper link disposed in said air box and connected to said wiper pivot to drive the same.

2. The combinatnion as set forth in claim 1, further comprising an engine hood pivotally installed and having a movable rear end portion, and a sealing member installed on an upper end of said air intake to provide a seal between said rear end portion of said engine hood and said air intake when said engine hood is in a closed position.

3. The combination as set forth in claim 1, in which said windshield glass has a lower end installed on said upper side of said air box at a place closely upward of the place at which said wiper pivot is installed.

4. The combination as set forth in claim 3, in which said front side of said air box is formed with a second opening, said wiper pivot being installed on said first side of said air box at a place between said first mentioned opening and said second opening.

5. The combination as set forth in claim 4, in which said openings are respectively fitted with grilles.

* * * * *